Figure 1:
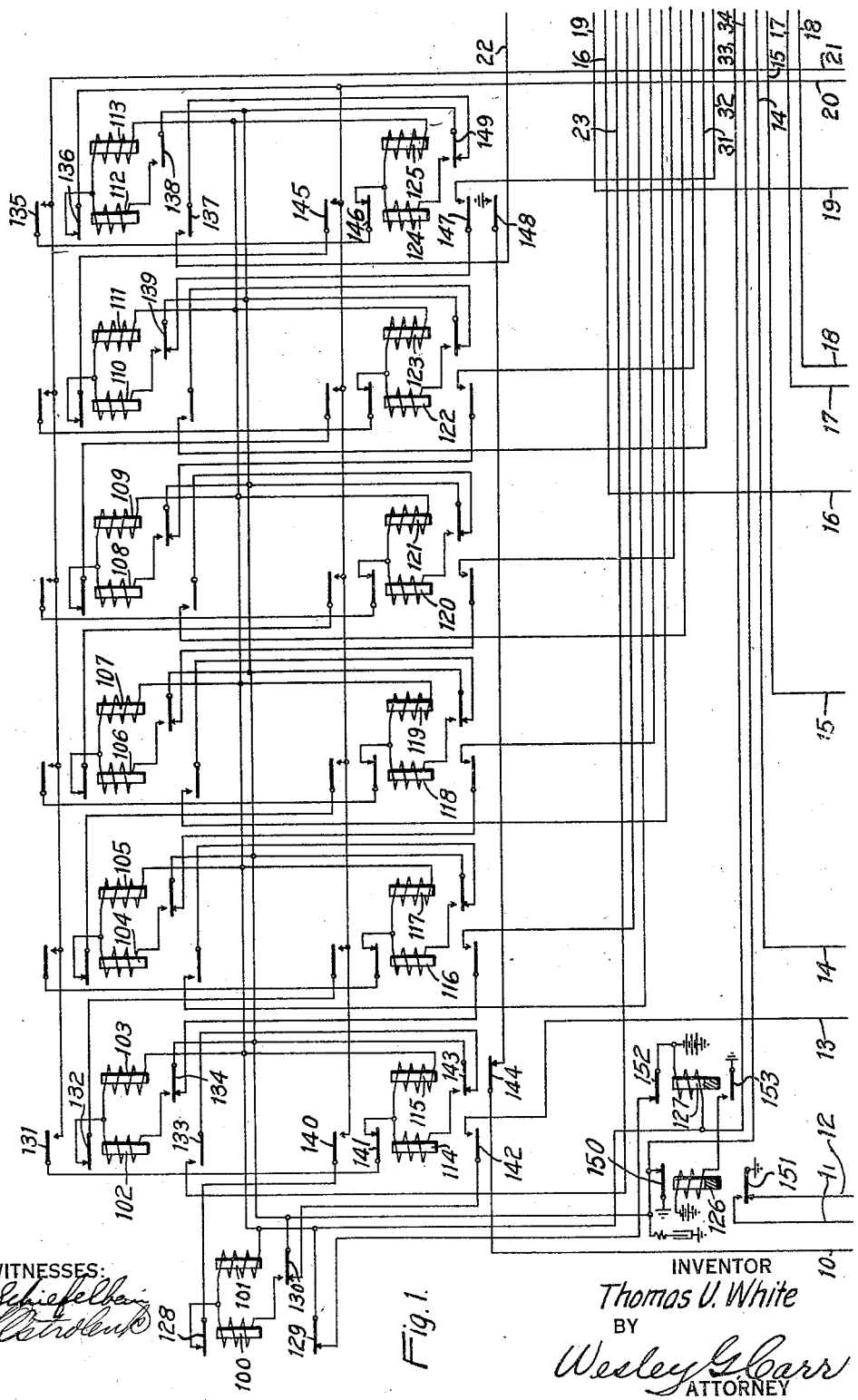

Feb. 10, 1931.  T. U. WHITE  1,792,261
SUPERVISORY CONTROL SYSTEM
Original Filed Aug. 28, 1925  8 Sheets-Sheet 1

WITNESSES:

INVENTOR
Thomas U. White
BY
Wesley G. Carr
ATTORNEY

Feb. 10, 1931. T. U. WHITE 1,792,261
SUPERVISORY CONTROL SYSTEM
Original Filed Aug. 28, 1925  8 Sheets-Sheet 2

WITNESSES:

INVENTOR
Thomas U. White.
BY
Wesley G. Carr,
ATTORNEY

Feb. 10, 1931.  T. U. WHITE  1,792,261
SUPERVISORY CONTROL SYSTEM
Original Filed Aug. 28, 1925  8 Sheets-Sheet 6

WITNESSES:

INVENTOR
Thomas U. White.
BY
ATTORNEY

Patented Feb. 10, 1931

1,792,261

UNITED STATES PATENT OFFICE

THOMAS U. WHITE, OF SYCAMORE, ILLINOIS, ASSIGNOR TO WESTINGHOUSE ELECTRIC & MANUFACTURING COMPANY, A CORPORATION OF PENNSYLVANIA

SUPERVISORY CONTROL SYSTEM

Application filed August 28, 1925, Serial No. 53,113. Renewed June 6, 1929.

My invention relates in general to electrical control systems and more particularly to systems for controlling and supervising from a central point remotely disposed electrical apparatus.

One of the objects of my invention is to provide an improved driving circuit for operating the elements in two remotely disposed groups in synchronism.

Another object of my invention is to provide improved means for increasing the number of apparatus units that may be selected by relay groups without increasing the number of relays in each group.

Another object of my invention is to provide a group of counting relays at the central station and a group of counting relays at the distant station common to several groups of selecting relays.

Another object of my invention is to provide a latching device at both the central and the distant stations for associating the various groups of selecting relays with the counting relays.

A further object of my invention is to provide improved means for obtaining synchronous operation of the switching relays which are employed to switch the counting relays to different groups of selecting relays.

There are other objects of the invention which together with the foregoing will be described in a detailed specification which is to follow.

In practicing my invention, I provide a group of counting relays in the first or central station and a group of counting relays corresponding in number at the distant or second station. Several groups of selecting relays, depending upon the number of operations that it is desired to perform and supervise, are associated with each group of counting relays at both the first and second stations. A switching relay of a latching type is provided for associating each group of selecting relays with the counting relays at each station.

A plurality of keys corresponding in number to the number of apparatus units that it is desired to control are provided at the first station. Signalling lamps are also provided for each apparatus unit that is to be controlled. At the dispatchers office there is also a key associated with each selecting relay. A driving circuit is provided at both the first and the second stations for controlling the operation of the relays in the counting relay groups in a predetermined sequence.

Briefly the operation of my invention is as follows:

It will be assumed that the dispatcher desires to bring about the operation of an apparatus unit at the second station. In order to accomplish this result the dispatcher will operate the key corresponding to the unit in the proper direction and will then operate a start key. By reason of the latter operation, the driving circuit at the first and second stations begins to function to operate the common relays in the counting relay groups in a predetermined sequence. One of the latching relays at each station is also operated to associate the first group of selecting relays with the counting relays which are energized sequentially by the operation of the counting relays in a definite sequence, the selecting relays are also operated, the corresponding selecting relays in the selecting relay groups at the office and station being simultaneously operated. The operation of the selecting relays serves to connect the signalling and control circuits with the relays at the first station that control the functioning of the signalling device and the control keys to the relays associated with the apparatus units at the station. The selecting operation continues until the signalling and control conductors are associated with the key that has been operated. When this condition occurs, the operation of the driving circuit is interrupted and a circuit is completed for bringing about the operation of the desired apparatus unit. As a result of the operation of this unit, a circuit is completed for operating the signalling device at the first station to indicate the operation.

The action of the driving circuit is now resumed and continues until all the counting relays in the counting relay group are operated. After all the counting relays have been operated, the selecting apparatus is released and restarted. In this case, the switching relay at both the first and second stations is operated to associate the second group of selecting relays with the relays in the counting relay groups. The driving circuit then brings about the operation of the counting relays in the same sequence as before.

The operation of the counting relays then controls the operation of the relays in the second selecting relay group. As it has been assumed that the operated key was selected by the selecting relays of the first group, the operation of the selecting relays of the second group is without particular function at the present time. After all the counting relays of the counting relay groups have been operated, the selecting apparatus is restored to normal and is so maintained provided that there are no other switching relays and groups of selecting relays to be operated.

Referring now to the drawing comprising Figs. 1 to 8 inclusive, sufficient apparatus and circuits have been shown by means of the usual conventional diagrams to enable my invention to be readily explained and understood.

The apparatus and circuits shown in Figs. 1 to 4 inclusive, are those located at the central or first station while the apparatus and circuits shown in Figs. 5 to 8 inclusive are those located in the distant or second station.

In Fig. 1, relays 100 to 125, inclusive, constitute the group of counting relays at the first station, relay 126 and 127 are of the usual slow-releasing type and control certain releasing operations.

Figure 2:
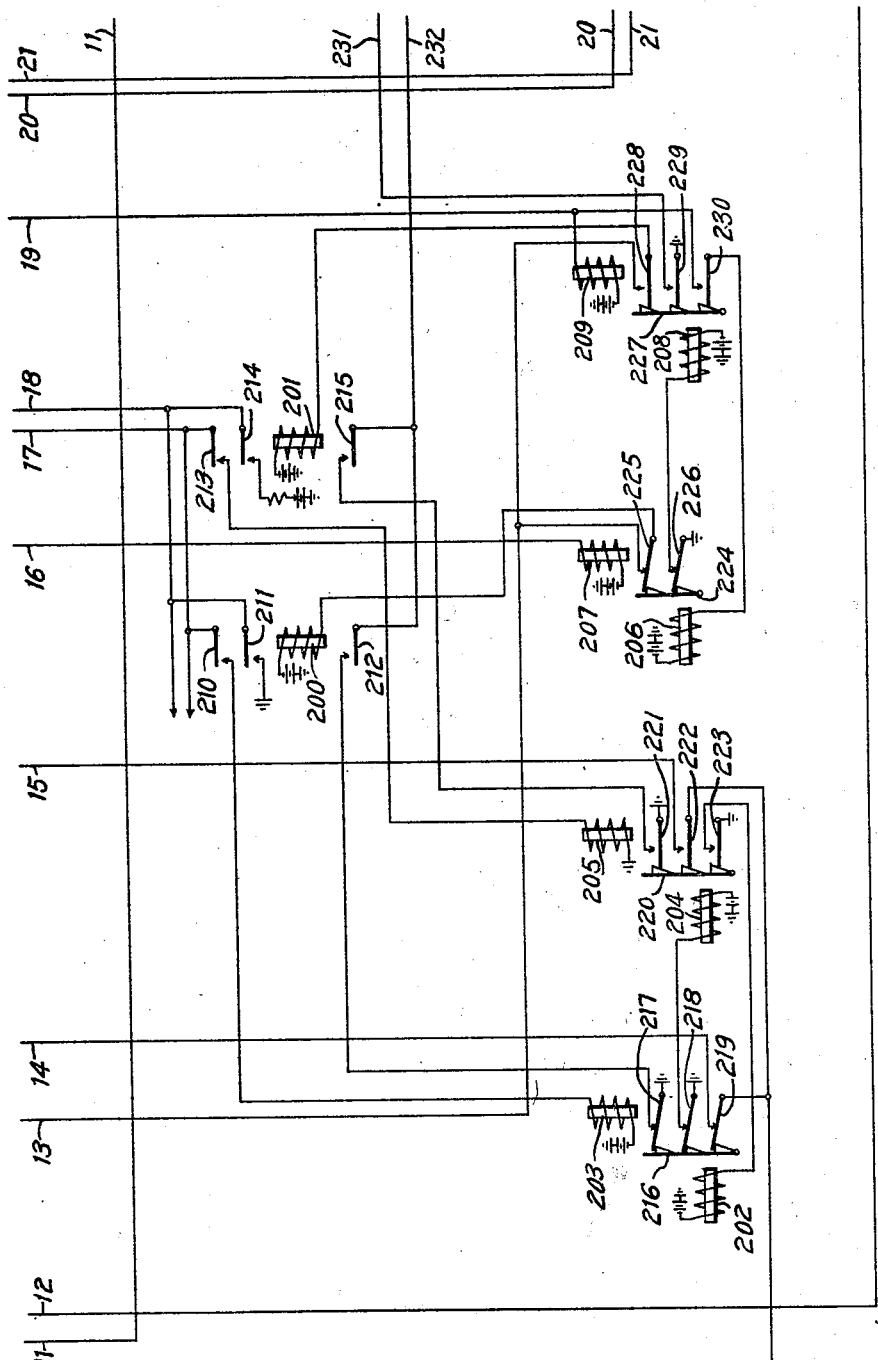

In Fig. 2, relays 200 to 209 inclusive are the control relays for operating the switching relays. Relays 202 and 203 are so constructed and positioned that the armature 216 mechanically holds or latches the armatures 217 to 219, inclusive, of the relay 203 in operated position. This mechanical construction is described in detail in the copending application of R. J. Wensley, Serial No. 750,183, filed Nov. 15, 1924, Patent No. 1,695,907, Dec. 18, 1925. The relays 204 and 205, 206 and 207, 208 and 209 are similarly constructed.

Figure 3:
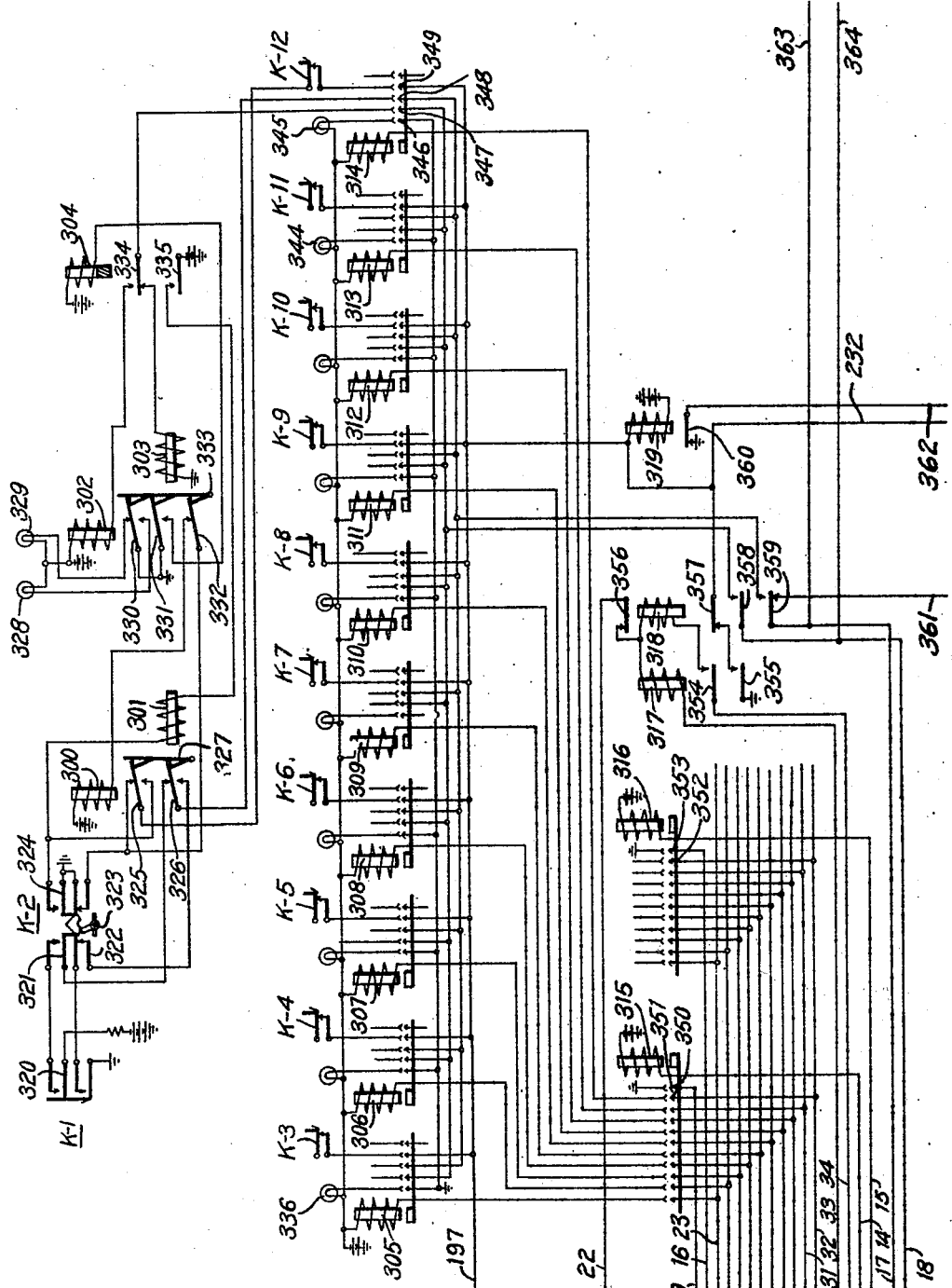

In Fig. 3, relays 305 to 314, inclusive, comprise the first group of selecting relays at the first station. The relays 315 and 316 are switching relays at the first station.

Relay 315 is operative to associate the first group of selecting relays with the counting relay group. A key K—2 is provided for the apparatus unit that it is desired to control. When the handle 223 is in one position, the springs of the key are in the position shown. When the handle is turned in the opposite direction, the springs of the key K—2 assume a position opposite from that shown. Relays 300 to 304, inclusive, are associated with each key, such as K—2.

The pairs of relays 300 and 301, and 302 and 303 have their armatures interlocked in the same manner as the relay 202 and 203. The relay 302 controls the operation of the signalling lamps 328 and 329. A key K—1 is common to all the keys, such as K—2, and is termed a control key. This key is of the usual single throw non-locking type. Keys such as K—3 to K—12, inclusive, which are associated with the selecting relays, are of the usual single-throw locking-type. Relays 317 to 319, inclusive, comprise part of the driving circuit.

Figure 4:
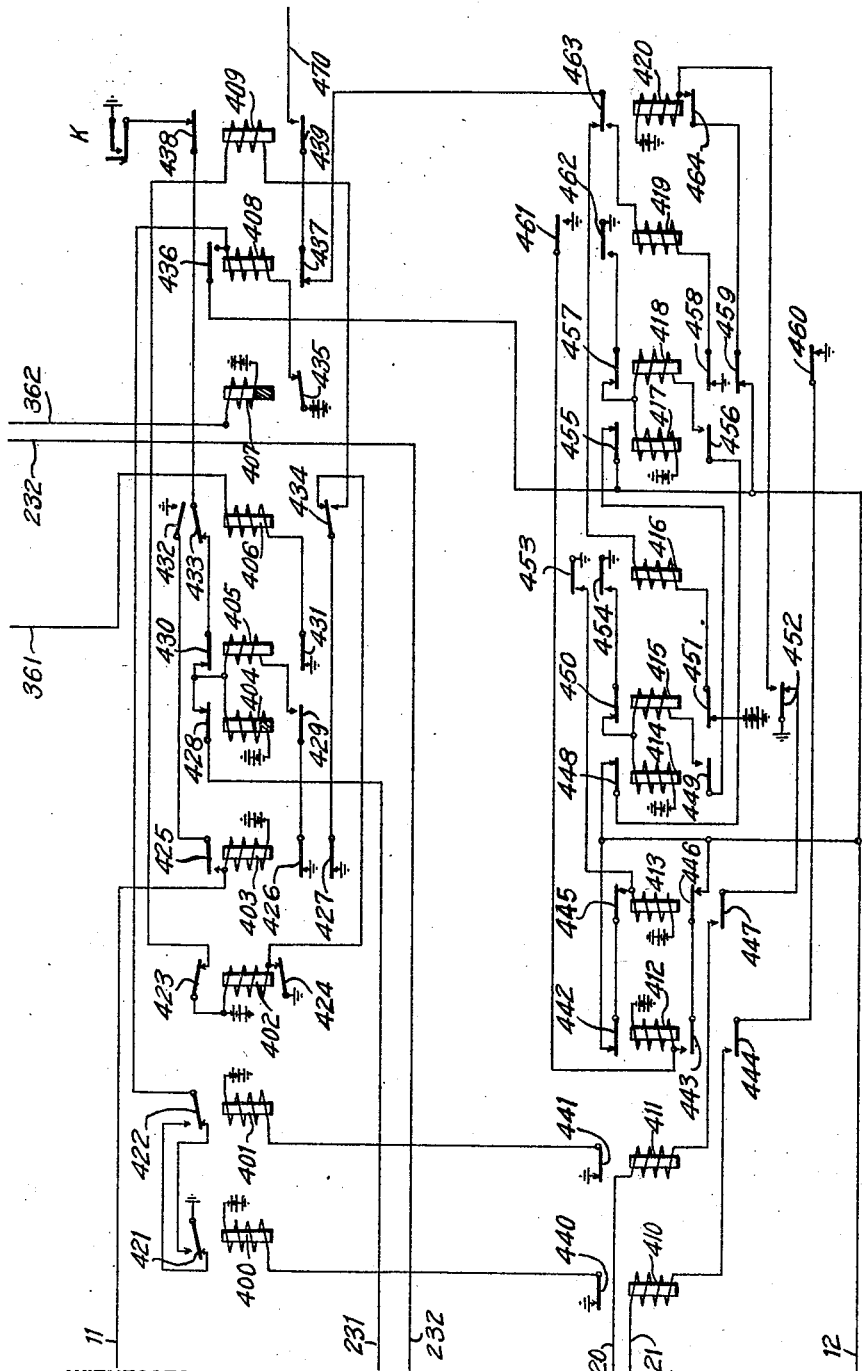

Relays 400 to 420, inclusive, of Fig. 4 constitute the remaining portion of the driving circuit at the first station.

Figure 5:
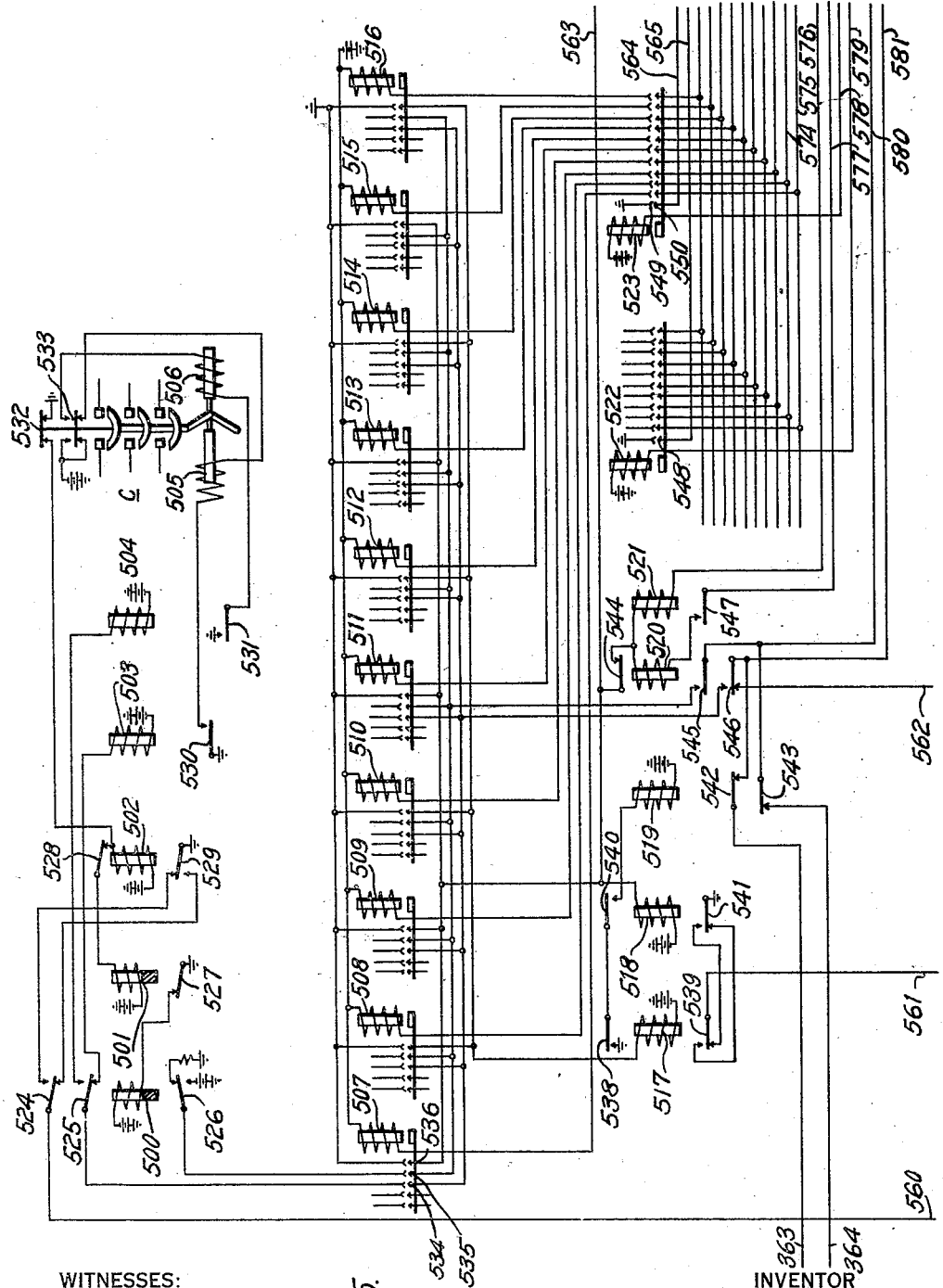

In Fig. 5, relays 507 to 516, inclusive, comprise the first group of selecting relays at the second station. Relays 522 and 523 are the switching relays. In the upper right-hand corner of Fig. 5 is shown a circuit interrupter. This interrupter may be of any well known type and perform any desired function at the second station. A group of relays, such as 500 to 504 is associated with each circuit interrupter such as C. Relays 517 to 521, inclusive, comprise a portion of the driving circuit at the second station.

Figure 6:
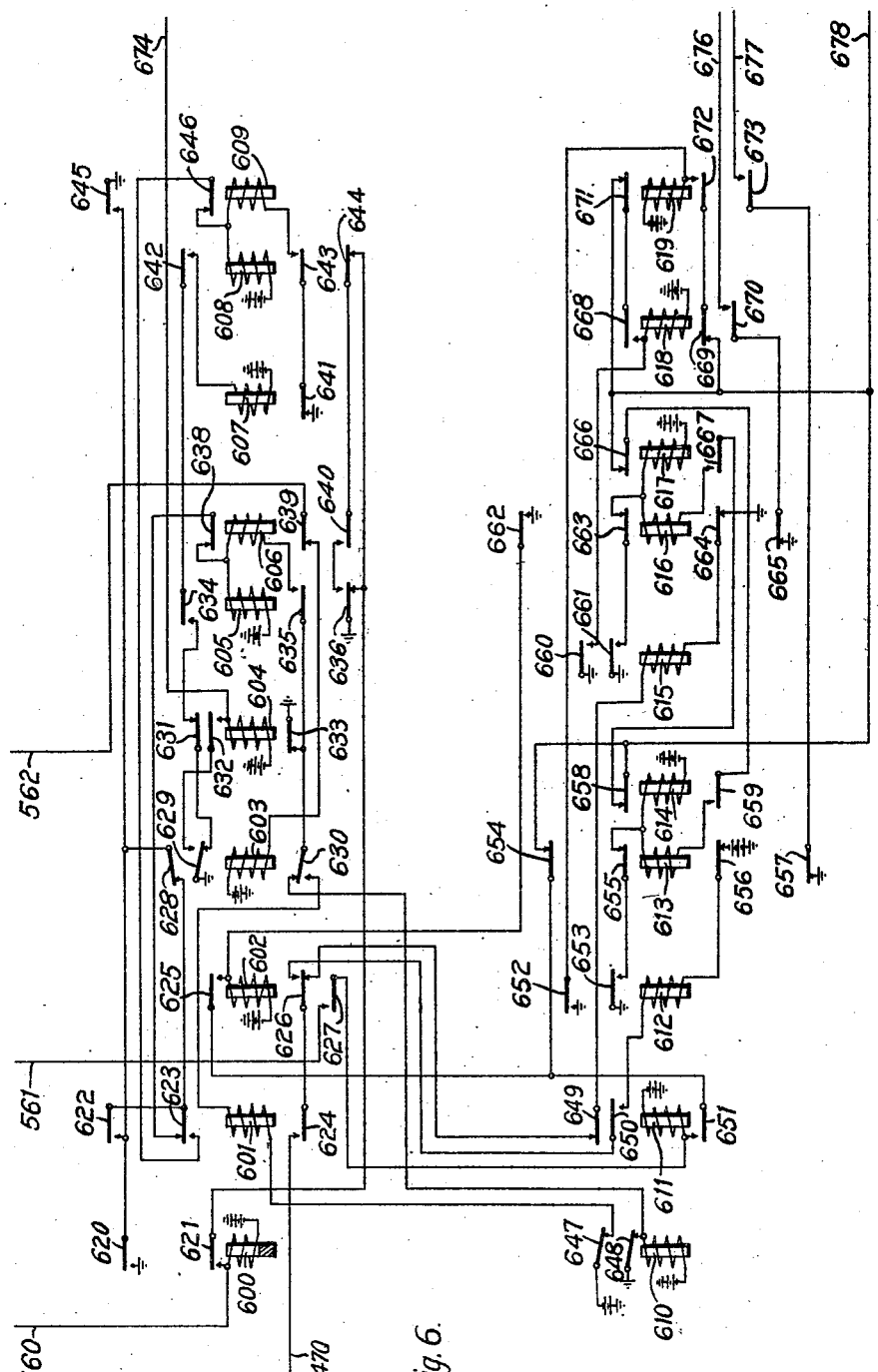

Relays 600 to 619, inclusive, of Fig. 6 comprise the remaining portion of the driving circuit at the second station.

Figure 7:
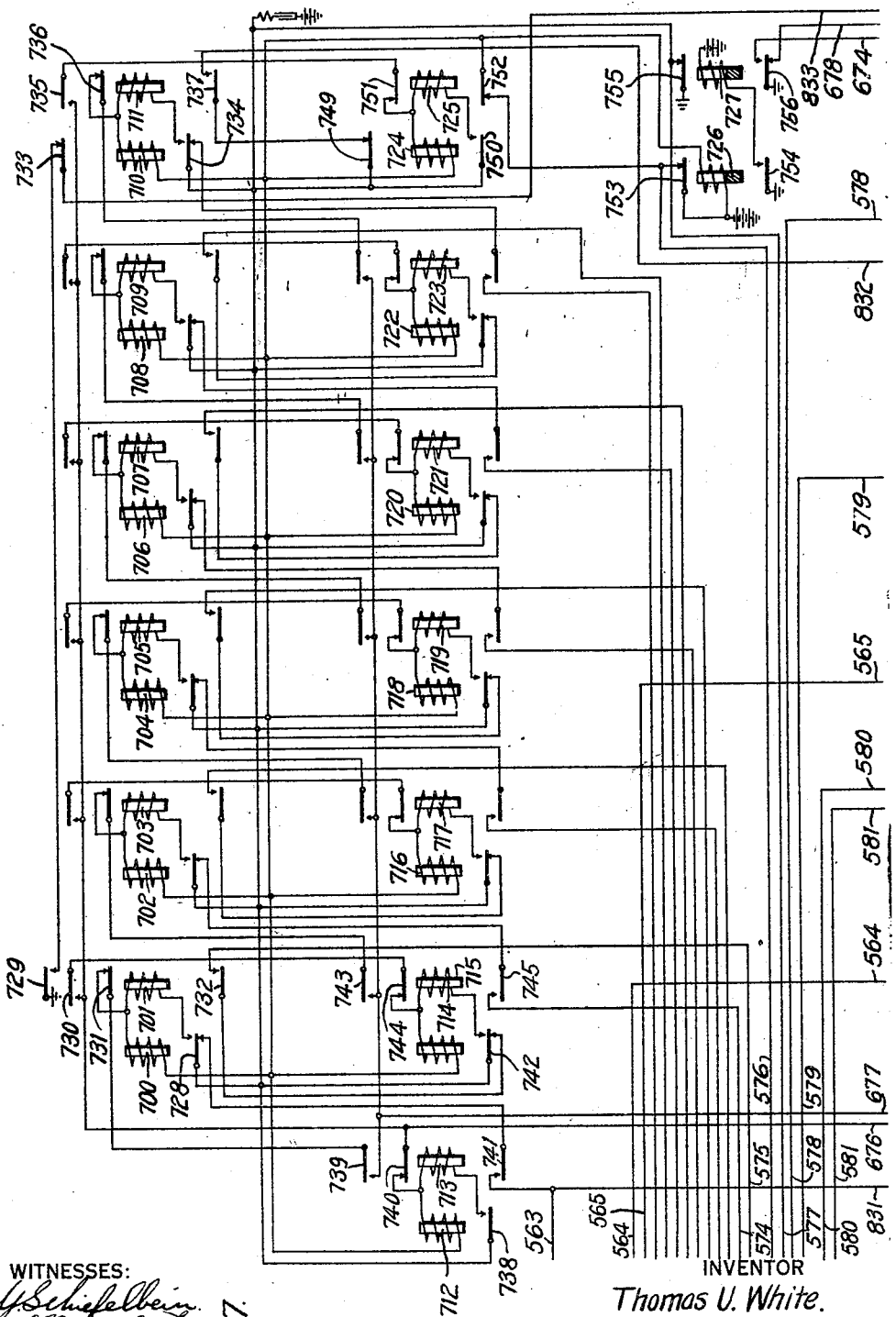

In Figs. 7, relays 700 to 725, inclusive, constitute the group of relays at the second station. Relays 726 and 727 are slow-releasing relays and control certain releasing operations as will appear.

Figure 8:
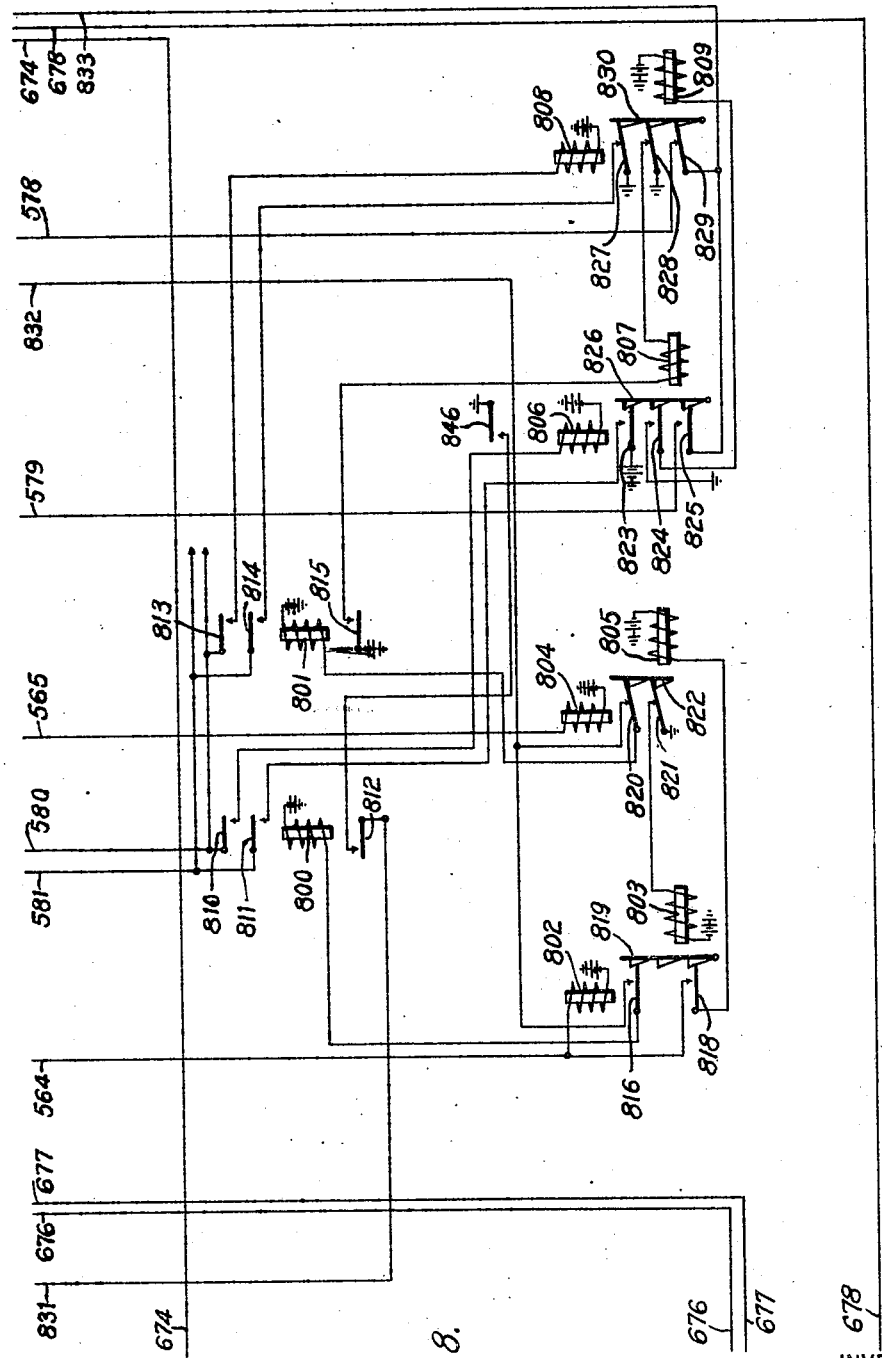

In Fig. 8, relays 800 to 809, inclusive, are the relays for controlling the operation of the switching relays such as 522 and 523. The relays 802 and 803, 804 and 805, 806 and 807, and 808 and 809 have their armatures mechanically interlocked in the same manner as the relays 202 and 203, previously described.

Having briefly described the apparatus shown in the drawings, I will now explain its detailed operation.

For this purpose, it will be assumed that the circuit interrupter at the second station is open and that the dispatcher desires to close it. In order to accomplish this result, the dispatcher will operate the proper key K—2 into a position opposite from that shown, and will then operate the start key K.

The selecting equipment is normally held in an inoperative position by a holding circuit. This holding circuit may be traced from ground by way of back contact and armature 431, holding relay 406, conductor 361 back contact and armature 359, conductor 363, armature 542 and its back contact, armature 546 and its back contact, conductor 562, armature 639 and its back contact and holding relay 603 to battery. The holding relays 406 and 603 are energized over this circuit.

The relay 406 is operated to prepare a starting circuit at armature 433, to open one point in the locking circuit of the relay 403 at armature 432 and to complete a circuit at armature 434 that may be traced from ground by way of back contact and armature 427, armature 434 and its front contact and relay 402 to battery. The relay 402 is energized to establish a locking circuit for itself at armature 424 and to prepare a circuit for the relay 409 at armature 423. The relay 402 is de-energized when the battery supply is disconnected, such as when a fuse blows. The provision of the relay 402 makes it necessary that battery circuit be reestablished before the selecting apparatus functions if the battery at the dispatcher's station has been disconnected.

At the second station the holding relay 603 is energized to prepare a starting circuit at armature 628, to open one point in the locking circuit of relay 604 at armature 629, to prepare a circuit for the relay 607 at the front contact of this armature, and to complete a circuit at armature 630 that extends by way of armature 633 and its front contact, armature 630 and relay 610 to battery. Relay 610 is energized to establish a locking circuit for itself at armature 648 and to prepare a circuit for the relay 601 at armature 647. Relay 610 is provided for the same purpose as the relay 402 before described.

Now when the key K is momentarily depressed by the dispatcher, there is a circuit completed that extends from ground by way of the springs of key K back contact and armature 438, armature 433 and its front contact, armature 430 and its back contact, and relay 404 to battery. The relay 404 is energized to open one point in another circuit for itself at armature 428 and to establish a circuit for the relay 405 over a circuit that extends from ground by way of contact and armature 426, armature 429, relay 405 and relay 404 to battery.

This circuit is ineffective as long as the key K remains depressed. When the key K is released, the short circuit is removed from relay 405 and this relay is energized in series with the relay 404. Relay 405 is energized to open one point in the holding circuit at armature 431, and at armature 430 to open one point in the starting circuit.

When the holding circuit is opened, the relays 406 and 603 are deenergized. Relay 406 is deenergized to prepare a locking circuit for the relay 403 at armature 432, to open another point in the original energizing circuit of the relay 404 at armature 433, and to complete a circuit at armature 434 that extends from ground by way of back contact 427, armature 434 and its back contact, relay 409 and front contact and armature 423 to battery. Relay 409 is energized over this circuit and operates to open another point in the original energizing circuit of the relay 404 at armature 438 and to prepare a driving circuit at armature 439.

At the first station, the relay 407 is also energized normally over a path that extends from ground by way of back contact and armature 360, conductor 362 and slow releasing relay 407 to battery. The relay 407 is energized to prepare a circuit for the relay 408 at armature 435. The relays 400 and 401 are also energized normally over circuits that extend by way of the armatures 440 and 441, respectively.

In the second station, the holding relay 603 is deenergized to open one point in the starting circuit at armature 628, to open one point in the circuit of the relay 607 at armature 629, to prepare a locking circuit for the relay 604 at the back contact of this armature and to complete a circuit extending from ground by way of armature 633 and its back contact armature 630 and its back contact, relay 601, and front contact and armature 647 to battery. Relay 601 is energized to prepare another starting circuit at armatures 622 and 623 and to complete the driving circuit at armature 624.

The driving circuit extends from battery by way of back contact and armature 451, relay 416, back contact and armature 463, back contact and armature 437, armature 439 and its front contact, conductor 470, front contact and armature 624, armature 626 and its back contact, back contact and armature 649, relay 615, and armature 664 and its back contact to ground.

The relays 416 and 615 are energized in series. The line relay 416 upon operating completes a circuit for the relay 414 at armature 454 and at armature 453, completes a circuit for the relay 413. Relay 414, upon operating, opens one point in the locking circuit of the relays 417 and 418 at armature 448 and at armature 449 completes a circuit that extends from ground by way of armature 151 and its back contact, conductor 12, armature 455 and its back contact, armature 449 and its front contact, relay 415 and relay 414 to battery. Relay 415 is short-circuited so long as the original circuit for relay 414, is maintained. Relay 413 operates to establish a locking circuit for itself at armature 445, to ground on conductor 12, to open one point in the locking circuit of the relay 412 at armature 446 to complete a circuit, that extends from ground by way of armature 452 and its back contact, armature 447 and its front contact, relay 411, conductor 20, armature 136 and its back contact, counting relay 113, armature 129 and its back contact, back contact and armature 152 to battery. The relays 411 and 113 are energized over this circuit.

Relay 113 is operated to establish a circuit extending from ground by way of armature 150 and its back contact, armature 138 and its front contact, relays 112 and relay 113, armature 129 and its back contact, and back contact and armature 152 to battery. This circuit is not effective so long as the original circuit for the relay 113 is maintained.

The relay 411 is energized to open the circuit of the relay 401. The relay 401 is deenergized to complete a circuit that extends from ground by way of armature 421 and its front contact, back contact and armature 422, relay 408 and front contact and armature 435 to battery. The relay 408 is energized to establish a locking circuit for itself at armature 436 to ground on conductor 12 and to open its driving circuit at armature 437.

The line relay 416 is deenergized to open the original energizing circuit of relay 414 at armature 454, thereby removing the short-circuit from the relay 415. The relay 415 is energized to open another point in the driving circuit at armature 451, to open the circuit including the relays 411 and 113 in series at armature 452 and to complete a circuit at the front contact of this armature for the relay 420. The relay 420 is energized to establish a locking circuit for itself at armature 464 to ground upon conductor 12, to disconnect the relay 416 from the driving circuit and to connect the line relay 419 thereto at armature 463.

The relay 411 is deenergized to complete a circuit for the relay 401. The relay 401 is operated to open the circuit of the relay 408. The relay 112 is energized to prepare a circuit for the relay 125 at armature 135 to open another point in the original energizing circuit of the relay 113 at armature 136 to complete a circuit at armature 137 that extends from ground by way of armature 150 and its back contact, armature 149 and its back contact, armature 137 and its front contact, conductor 22, armature 356 and its back contact, relay 317, conductor 33, armature 129 and its back contact and back contact and armature 152 to battery.

The relay 317 is energized over the above circuit and operates to complete a circuit at armature 354 that extends from ground by way of armature 150 and its back contact, conductor 34, armature 354 and its front contact, relay 318, relay 317, conductor 33, armature 129 and its back contact and back contact and armature 152 to battery, and to complete a circuit at armature 355 that extends from ground by way of said armature and its front contact, back contact and armature 357 and relay 319 to battery. The relay 319 is energized to open the circuit of the slow-releasing relay 407. The relay 318 is not energized over the previously traced circuit by reason of the fact that it is shunted so long as the original energizing circuit in the relay 317 is maintained.

At the second station, it will be remembered that the line relay 615 is energized in series with the relay 416. Relay 615 is operated to complete a circuit for the relay 617 at armature 661 and to complete a circuit for the relay 618 at armature 660. The relay 617 is energized to open a point in the circuit of the relays 613 and 614 and at armature 666, to complete a circuit at armature 667 over a path that extends from ground by way of armature 756 and its back contact, conductor 678, armature 658 and its back contact, armature 667 and front contact, relay 616 and relay 617 to battery. This circuit is ineffective to energize the relay 616 so long as the original circuit of the relay 617 is maintained.

The relay 618 is operated to establish a locking circuit for itself at armature 668 to ground upon conductor 678, to open a point in the locking circuit of the relay 619 at armature 669 and to complete a circuit at armature 670 over a path that extends from ground by way of back contact and armature 665, armature 670 and its front contact, conductor 676, armature 740 and its back contact, relay 712, armature 752 and its back contact, and back contact and armature 753 to battery.

The relay 712 is energized over this circuit and operates to complete a circuit that extends from ground by way of armature 755 and its back contact, armature 738 and its front contact, relay 713, relay 712, armature 752 and back contact and back contact and armature 753 to battery. This circuit is not effective to energize the relay 713 by reason of the fact that it is short-circuited by the original circuit for the relay 712.

Now when the driving circuit is opened by the operation of the relay 408 at the first station, the line relay 615 at the second station is deenergized. As a result of this the original circuit for the relay 618 is opened at the armature 660 and the short-circuit is removed from the relay 616 at armature 661. Relay 616 is immediately energized to open the impulsing circuit at armature 665, to open another point in the driving circuit at armature 664, to open another point in the circuit of the relay 617 at armature 663 and to complete a circuit at armature 662 for the relay 602.

The relay 602 is energized to establish a locking circuit for itself, by way of ground conductor 678, at armature 625, to prepare a new point in the drive circuit at armature 626 and to prepare a circuit for the relay 611 at armature 627. When the impulsing circuit is opened the short circuit is removed from the relay 713 and this relay is operated to prepare a circuit for the counting relay 700 at armature 739, to open another point in the original energizing circuit of the relay 712 at armature 740 and to complete a circuit at armature 741 that extends from ground by way of armature 755 and its back contact, armature 728 and its back contact, armature 741 and its front contact, conductor 563, and relay 518 to battery.

The circuit in multiple with this extends by way of armature 544 and its back contact, relay 521, conductor 576, and back contact and armature 753 to battery. The relay 521 is energized to complete a circuit that extends from ground by way of armature 755 and back contact, conductor 577, armature 547 and its front contact, relay 520, relay 521, conductor 576 and back contact and armature 753 to battery.

This circuit is ineffective to energize the relay 520 until the first circuit of the relay 521 is opened. The relay 518 is energized to prepare a circuit for the relay 519 at armature 540 and to complete a circuit at armature 541 over path that extends from ground by way of said armature and its front contact, back contact and armature 539, conductor 561, front contact and armature 627 and relay 611 to battery. The relay 611 is energized to open one point in the previously traced driving circuit at armature 649, to prepare a new driving circuit at armature 650 and to establish a locking circuit for itself at armature 651 from ground conductor 678.

When the circuit of the slow-releasing relay 407, at the first station, is opened by the operation of the relay 319, the relay 407 is deenergized after a short interval of time to open the circuit of the relay 408 at armature 435. The relay 408 is deenergized to complete the driving circuit.

The driving circuit now extends from ground by way of back contact and armature 458, line relay 419, front contact and armature 463, back contact and armature 437, armature 439 and its front contact, conductor 470, front contact and armature 624, armature 626 and its front contact, armature 650 and its front armature, line relay 612, armature 656 and its back contact to battery.

Line relay 419 is operated to complete a circuit for the relay 417 at armature 462 and to complete the circuit relay 412 at armature 461. The relay 417 is energized to open the circuit of the relays 414 and 415 at armature 455 and to prepare a circuit at armature 456 for the relay 418. The relay 415 is deenergized to prepare a circuit for relay 414 at armature 450 and to prepare a point in the driving circuit at armature 451 and to open the original energizing circuit of the line relay at armature 452 and to prepare an impulsing circuit at the back contact of this armature. The relay 414 is deenergized to open one point of the circuit of relay 415 and to establish a circuit at armature 448 that extends from ground on conductor 12 by way of back contact and armature 448, armature 456 and its front contact, relay 418 and relay 417 to battery.

The relay 418 is not energized as long as the original circuit of the relay 417 is maintained. The relay 412 is operated to open the locking circuit of the relay 413 at armature 442 to prepare a locking circuit for itself at armature 443 and to complete an impulsing circuit at armature 444. The relay 413 is deenergized to open another point in the impulsing circuit at armature 447 and to complete the locking circuit of the relay 412, to ground upon conductor 12.

The impulsing circuit now extends from ground by way of armature 460, armature 444 and its front contact, relay 410, conductor 21, front contact and armature 135, armature 146 and its back contact, relay 125, armature 129 and its back contact, and back contact and armature 152 to battery. The relay 125 and the relay 410 are energized over this circuit. Relay 125 is operated to open the original energizing circuit of the relay 317 at armature 149 and to complete a circuit at the front contact of this armature that extends from ground by way of armature 150 and its back contact armature 149 and its front contact, relay 124, relay 125, armature 129 and its back contact and back contact and armature 152 to battery.

The circuit for the relay 124 is ineffective as long as the original energizing circuit of the relay 125 is maintained.

When the short circuit is removed from the relay 318, this relay is operated in series with the relay 317. Relay 318, upon operating, opens another point in the original energizing circuit of the relay 317 at armature 356, opens the circuit of the relay 319 at armature 357 and at armatures 358 and 359 connects the signalling and control conductors 364 and 363 to the springs of the various selecting relays, in all the relay groups. The relay 319 is deenergized to complete a circuit at armature 360 for the slow-releasing relay 407. Relay 410 is energized in series with the counting relay 125 and operates to open the circuit of relay 400. The relay 400 is deenergized to complete a circuit that extends from ground by way of armature 421 and its back contact, front contact and armature 422, relay 408 and front contact and armature 435.

Now when the slow-releasing relay 407 is energized over the circuit just described, the relay 408 is operated to establish a locking circuit for itself at armature 436 and to open the driving circuit at armature 437. The line relays 419 and 612 are thereby deenergized. Relay 419 is deenergized to open the original energizing circuit of the relay 412 at armature 461 and to remove the short circuit from the relay 418 at armature 462. The relay 418 is operated to open the circuit of relay 417 at armature 457 and to open another point in the driving circuit at armature 458, to open the circuit of relay 420 at armature 459 and to open the impulsing circuit at armature 460.

The relay 420 is deenergized to disconnect the line relay 419 from the driving circuit and to connect the line relay 416 thereto. The opening of the impulsing circuit removes the short circuit from the relay 124 and the relay 410 is deenergized. The relay 410 retracts its armature 440 to complete a circuit for the relay 400. The relay 400 is energized to open the original energizing circuit of the relay 408. The relay 124 is energized to prepare the circuit for the counting relay 111 at armature 145 and to open another point in the original energizing circuit of relay 125 at armature 146, to connect ground to conductor 32 at armature 147 over a path that extends from ground by way of armature 150, armature 139 and its back contact, armature 147 and its front contact, conductor 32, to spring 350, and to complete a circuit at armature 148 that extends from ground by way of front contact and armature 148, conductor 10, armature 219 and front contact, conductor 14 and switching relay 315 to battery.

The switching relay 315 is energized over this circuit and operates to connect the selecting relays 305 to 314, inclusive, under control of the counting relays 100 to 125, inclusive. Another result of the operation of the relay 315 is that there is a circuit completed that extends from ground by way of working contact and spring 351 and said spring, conductor 19 and relay 209 to battery.

The relay 209 is energized to prepare a circuit for the relay 201 at armature 228, and to complete a circuit at armature 230 for the relay 206. The relay 206 is energized to operate armature 224 thereby permitting the armatures 225 and 226 of the relay 207 to assume their normal positions. By the operation of the armature 225, one point in the circuit of the relay 200 is opened. The operation of the armature 226 opens the circuit of the relay 208. The relay 208 is deenergized to latch armatures 228 to 230 of the relay 209 in engagement with their front contacts.

When the switching relay 315 is operated, as before described, there is completed a circuit that extends from ground by way of conductor 32 that was connected to ground by the operation of the armature 147, spring 350 and its working contact and selecting relay 314 to battery.

The selecting relay 314 is energized to complete a circuit for the signalling lamp 345 at spring 346, to prepare a signalling circuit at spring 347, to prepare a control circuit at spring 348 and to prepare a circuit for the relay 319 at spring 349. By reason of the fact that key K—2 has been operated and the springs are in a position opposite to that shown, ground is disconnected from the conductor extending through springs of the key K—12, therefore, there will be no circuit completed for the relay 319. Consequently the relay 407 will remain energized as will the relay 408. The driving action at the first station is thus interrupted.

At the second station, it will be remembered that the line relay 612 is energized in series with the line relay 419. The relay 612 is operated to complete a circuit for relay 614 at armature 653 and to complete a circuit at armature 652 for the relay 619. Upon operating, the relay 614 opens the circuit of the relays 616 and 617 at armature 658 and at armature 659 prepares a circuit for the relay 613. The relay 616 is deenergized to open the original energizing circuit of the relay 602 at armature 662, to prepare a circuit for the relay 617 at armature 663, to prepare a point in the driving circuit at armature 664 and to prepare an impulsing circuit at armature 665.

The relay 617 is deenergized to open one point in the circuit of the relay 616 at armature 667 and to complete a circuit at armature 666 that extends from ground upon conductor 678 by way of back contact and armature 666, armature 659 and its front contact, relay 613 and relay 614 to battery. This circuit is ineffective to cause the operation of the relay 613 until the original energizing circuit of the relay 614 is opened.

The relay 619 is operated to open the locking circuit of the relay 618 at armature 671, to prepare a locking circuit for itself at armature 672 and to complete an impulsing circuit at armature 673. Relay 618 is deenergized to open another point in the impulsing circuit at armature 670, to complete a locking circuit for relay 619, at armature 669.

As previously mentioned, the impulsing circuit extends from ground by way of armature 657, armature 673 and its front contact, conductor 677, front contact and armature 739, armature 731 and its back contact, relay 700, armature 752 and its back contact and back contact and armature 753 to battery. The relay 700 is energized to open the circuit of the relay 518 and to remove the short-circuit from the relay 520 at armature 728 and to complete a circuit at the front contact of this armature over a path that extends from ground by way of armature 755 and its back contact, armature 728 and its front contact, relay 701, relay 700, armature 752 and its back contact, and back contact and armature 753 to battery. The circuit for the relay 701 is not effective to bring about the operation of this relay until the original circuit for the relay 700 is opened. The relay 520 is energized to open another point in the original circuit of the relay 521 at armature 544, to connect the signalling and control conductors 364 and 363 to the springs of the relays in the various selecting relay groups at armatures 545 and 546, respectively. The relay 518 is deenergized to open the original energizing circuit of the relay 611 at armature 541.

When the relay 408 in the first station is operated, as before described, the driving circuit is opened and the relay 612 is deenergized. As a result of this operation, the original energizing circuit of the relay 619 is opened at armature 652 and armature 653, the short circuit is removed from the relay 613. The relay 613, upon operating, opens the locking circuits of the relays 602 and 611 at armature 654, and opens another point in the original energizing circuit of the relay 614 at armature 655, opens a point in the driving circuit at armature 656 and at armature 657 opens the impulsing circuit.

The relay 602 is deenergized to open another point in the original energizing circuit of the relay 611 at armature 627 and to prepare the driving circuit at armature 626. Relay 611 is deenergized to disconnect the line relay 612 from the driving circuit and to connect the line relay 615 thereto at armatures 650 and 649, respectively.

By the opening of the impulsing circuit the short circuit is removed from the counting relay 701 and this relay is energized in series with the relay 700. The relay 701 is operated to prepare a circuit for the counting relay 714 at armature 730, to open another point in the energizing circuit of the relay 700 at armature 731, to connect ground to conductor 575 over a path that extends from ground by way of armature 755 and its back contact, armature 742 and its back contact, armature 732 and its front contact and conductor 575, and to complete a circuit at armature 729 that extends from ground by way of said armature and its front contact, back contact and armature 733, conductor 833, armature 829 and its front contact, conductor 578 and switching relay 523 to battery.

The relay 523 is energized to connect the selecting relays 507 to 516, inclusive, under control of counting relays 700 to 725, inclusive. Another result of the operation of the relay 523 is that a circuit is completed that extends from ground by way of working contact of spring 549 and said spring, conductor 564 and relay 802 to battery. The relay 802 is energized to prepare a circuit for the relay 800 at armature 816, and to complete a circuit at armature 818 for the relay 805.

The relay 805 is energized to release the armature 822 thereby permitting the armature 820 and 821 of the relay 804 to restore to their normal position. By the operation of the armature 820 a point in the circuit of the relay 801 is opened.

By the operation of the armature 821, the circuit for the relay 803 is opened. The relay 803 is deenergized to retract the armature 819 thereby latching the armature 816, and 818 in engagement with their front contacts.

A further result of the operation of the relay 523 is that a circuit is completed that extends from ground upon conductor 575 by way of spring 550 and its working contact and selecting relay 507 to battery. Selecting relay 507 is energized to complete a circuit for the relay 518 at spring 536, to prepare a signalling circuit at spring 535, and to prepare a control circuit at spring 534. The relay 518 is energized to prepare a circuit for the relay 519 at armature 540 and prepare a circuit for relay 611 at 541.

As the driving circuit is maintained open by the operation of the relay 408 at the first station, no further selecting action takes place. It will be understood that the action of the driving circuit, by which the selecting relays 314 and 507 at the first and second stations, respectively, are energized, occurs substantially simultaneously. By the lighting of the signalling lamp 345, the dispatcher is informed of the selecting position of the equipment. By the operation of the selecting relays 314 and 507, there is a signalling circuit that extends from ground by way of front contact and armature 526 working contact of spring 535 and said spring, front contact and armature 545, armature 543 and its back contact, conductor 364, armature 358 and front contact, spring 347 and its working contact, armature 334 and its back contact and relay 303 to ground. As this circuit extends from ground to ground, its completion has no function.

Should the signalling devices 328 and 329 at the dispatcher's office indicate a closed condition of the circuit interrupter, the above traced circuit will be effective to correct the indication of the signalling devices to inform the dispatcher of the proper position of the unit.

In order to bring about the closure of the interrupter, the dispatcher will operate the common control key K—1. This key, it should be noted, is designed, as is usual with keys, to open contacts when moved in one direction and close the contacts when moved in the opposite direction. As a result of this operation, there is a circuit completed extending from battery by way of spring 320 and its working contact, spring 321 and its working contact, front contact and armature 326, working contact of spring 348 and said spring, front contact and armature 359, conductor 363, armature 542 and its back contact, armature 546 and its front contact, spring 535 and its working contact, armature 525 and its front contact, and relay 503 to ground. The relay 503 is energized to complete a circuit for the closing coil of the circuit breaker C. The closing coil 505 is operated to bring about the closing of the circuit interrupter.

By the operation of the auxiliary switch 533, the circuit of the closing coil 505 is opened and a circuit is prepared for the opening coil 506.

By the operation of the auxiliary switch 532 the circuit of the relay 502 and the relay 501 is opened. The relay 502 is deenergized to open another point in the circuit of relay 501 at armature 528 and to complete a circuit at armature 529 that extends from ground by way of said armature and its back contact, front contact and armature 524, conductor 560 and relay 600 to battery. The relay 600 is energized to establish a locking circuit for itself to ground by way of back contact and armature 636 at armature 621 and to complete an additional circuit for the relay 608 at armature 620.

The relay 501 is deenergized after a short interval of time to open the circuit of the relay 500 at armature 527. The relay 500 therefore deenergizes to connect the above traced signalling circuit to battery at armature 526, to open the circuit of the relay 503 at armature 525, to prepare a circuit for the relay 504 at the back contact of this armature, and to open the previously traced circuit for the relay 600 at armature 524.

By the connection of battery to the signalling circuit, the relay 303 at the first station is operated to operate the armature 333 thereby permitting the armatures 330 to 332, inclusive, to assume their normal positions. The operation of the armature 330 brings about the effacement of the lamp 329 and the lighting of the lamp 328. These changes in supervisory signals inform the dispatcher of the completion of the desired operation at the station.

The operation of the armature 332 opens a point in the circuit of the relay 300. The operation of the armature 331 completes a circuit for the relay 304. The relay 304 is energized to open the signalling circuit at armature 334, to complete a circuit for the relay 301 at armature 335. The circuit extends from battery by way of armature 335 and its front contact, relay 301, and working contact of spring 324 and said spring to ground. Relay 301 is energized over this circuit and operates armature 327 to permit armatures 325 and 326 of the relay 300 to assume their normal position.

By the operation of the armature 326, one point in the previously traced control circuit is opened and a new control circuit is prepared at the back contact of this armature. By the operation of armature 325, a circuit is completed that extends from ground by way of spring 324 of key K—2 and its working contact, back contact and armature 325, springs of key K—12, working contact of spring 349 and said spring and relay 319 to battery.

The relay 319 is energized to open the circuit of the slow-releasing relay 407 at armature 360. The relay 407 is deenergized after a short interval of time to open the circuit of relay 408 which is deenergized to complete the driving circuit.

When the driving circuit is completed, the relays 416 and 615 are energized in series. As it has been assumed that the dispatcher only desires to bring about the operation of the circuit interrupter at the second station, there will be no further control operations completed during the subsequent operation of the selecting apparatus. Consequently, the action of the driving circuit will continue, line relays 416 and 419 at the first station and the line relays 612 and 615 at the second station, being alternately operated to control the selecting apparatus in a manner that will be obvious from the preceding description.

By the operation of the line relays 416 and 419 in the first station, the counting relays 111 and 110, 123 and 122, 109 and 108, 121 and 120, 107 and 106, 119 and 118, 105 and 104, 117 and 116, 103 and 102, 115 and 114, 101 and 100 will be energized in the sequence mentioned. By the operation of these counting relays the selecting relays 313, 312, 311, 310, 309, 308, 307, 306, and 305 are energized and deenergized to prepare the control circuits in the same manner as the relay 314.

At the second station, the alternate operation of the line relays 615 and 612 brings about the operation of the counting relays 714 and 715, 702 and 703, 716 and 717, 704 and 705, 718 and 719, 706 and 707, 720 and 721, 708 and 709, 722 and 723, 710 and 711, 724 and 725 which are energized in the sequence set forth. By the operation of these counting relays, the selecting relays 508, 509, 510, 511, 512, 513, 514, 515, and 516 are energized and deenergized to prepare signalling and control circuits in the same manner as the relay 507. By the action of the driving circuit, the corresponding selecting relays are operated simultaneously. Consequently, if the dispatcher desires to control any other apparatus unit at the second station, its control will occur in substantially the same manner as before described, the action of the driving circuit being interrupted during this period.

When the counting relay 115 at the first station is operated as a result of the energization of the line relay 419, the circuit of the selecting relay 305 is opened at armature 143, a circuit is completed for the relay 114 at the front contact of this armature and at armature 144 the circuit of the switching relay 315 is opened. The counting relay 114 is short circuited until the original circuit of the relay 115 is opened. The selecting relay 305 is deenergized to restore the circuits that are controlled to normal. The switching relay 315 is deenergized to disassociate the first group of selecting relays 305 to 314, inclusive, from control of the counting relays 100 to 125, inclusive.

A further result of the deenergization of the switching relay 315 is that ground is removed from the conductor 19. This effects the deenergization of the relay 209 and relay 206. The armatures 228, 229 and 230 of the relay 209 are maintained in engagement with their front contacts by the armature 227 of the relay 208.

The relay 206 is deenergized to retract the armature 224. By the deenergization of the selecting relay 305, the circuit of the relay 319 is opened and this relay is deenergized to complete a circuit for the relay 407. The relay 407 is energized to complete a circuit for the relay 408 which is operated to establish a locking circuit for itself and to open the driving circuit. Line relay 419 is deenergized to cause a removal of the short-circuit from the relay 114.

The relay 114 is operated to prepare a circuit for the counting relay 101 at armature 140, to open a point in the original circuit for the relay 115 at armature 141 and to complete a circuit at armature 142 that extends from ground by way of armature 150 and its back contact, armature 130 and its back contact, armature 142 and its front contact, conductor 13, front contact and armature 228 and relay 201 to battery. The relay 201 is energized to prepare a circuit for the relay 319 at armature 215, to prepare a circuit for the relay 205 at armature 213 and to place battery upon the conductor 18 at armature 214.

Another result of the deenergization of the line relay 419 is that the relay 420 is deenergized to prepare the driving circuit including the line relay 416.

At the second station, the counting relay 710 is energized as a result of the operation of the line relay 612, at the same time that the counting relay 115 in the first station is operated. Upon operating, relay 710 opens the circuit of the selecting relay 507 at armature 734, at the front contact of this armature completes a circuit for the relay 711, and at armature 733 opens the circuit of the switching relay 523. The counting relay 711 is not energized so long as the original circuit for the relay 710 is maintained. The selecting relay 507 is deenergized to disconnect the signalling and control circuits that it controls and to open a circuit of the relay 518. Relay 518 is deenergized to remove ground from conductor 561, thereby opening the original energizing circuit of the relay 611.

The switching relay 523 is deenergized to disconnect the group of selecting relays 507 to 516, inclusive, from control of the counting relays 700 to 725, inclusive. A further result of the deenergization of the relay 523 is that ground is removed from the conductor 564. The removal of ground from conductor 564 opens the circuit of the relays 802 and 805. The deenergization of the relay 802, is without further function at the present time by reason of the fact that armatures 816 and 818 are latched into engagement with their front contacts. The relay 805 is deenergized to position the armature 822 to latch the armatures 820 and 821 of the relay 804 in their operated position, when the relay 804 is energized.

Now when the line relay 612 is deenergized as a result of the operation of the relay 408 at the first station, the short-circuit is removed from the relay 711 following the operation in the relay 613. A further result of the operation of relay 613 is that the locking circuits of the relays 602 and 611 are opened. These relays are deenergized to prepare a new driving circuit. The relay 711 is energized to open another point in the original energizing circuit of the relay 710 at armature 736, to prepare a circuit for the counting relay 724 at armature 735 and to complete a circuit at armature 737 that extends from ground by way of armature 755 and its back contact, armature 749 and its back contact, armature 737 and its front contact, conductor 832, front contact and armature 816, and relay 800 to battery. The relay 800 is energized to prepare a circuit for the relay 518 at armature 812 and to prepare a circuit for the relay 806 at armature 810.

A circuit is now completed for bringing about the operation of the relay 205 at the first and the relay 806 at the second station. These relays operate to prepare circuits for the second switching relays 316 and 522. The circuit for the relay 806 extends from battery by way of front contact and armature 214, conductor 18, conductor 364, back contact and armature 543, conductor 580, armature 810 and its front contact, and relay 806 to battery. The relay 806 is energized to place ground upon conductor 831 at armature 846, to connect battery to conductor 581 at armature 823, to complete a circuit for the relay 809 at armature 824 and to prepare a circuit at armature 825 for the switching relay 522.

The relay 809 is deenergized to retract its armature 830 thereby latching armatures 827, 828 and 829 in their operative positions.

By the connection of ground to conductor 831, a circuit is completed for the relay 518. The relay 518 is energized to connect ground to conductor 561, thereby preparing a circuit for the relay 611.

By the connection of battery to conductor 581, there is a circuit completed that extends by way of this conductor, back contact and armature 542, conductor 363, conductor 17, armature 213 and its front contact and relay 205 to ground. The relay 205 is energized to connect ground to conductor 232 at armature 221, to prepare a circuit for the switching relay 316 at armature 222 and to complete a circuit at armature 223 for the relay 202. The relay 202 is energized to attract armature 216 thereby permitting the armatures 217, 218 and 219 to restore to normal. By the operation of the armature 219, another point in the circuit of the switching relay 315 is opened. By the operation of the armature 218, the circuit of the relay 204 is opened.

The relay 204 is deenergized to retract armature 220 whereby the armatures 221, 222 and 223 are latched in their operative positions.

By the connection of ground to conductor 232, a circuit is completed for the relay 319. The relay 319 is energized to open a circuit for slow-releasing relay 407. The relay 407 is deenergized after a short interval of time to open a circuit of the relay 408. The relay 408 is deenergized to complete the driving circuit including the line relays 416 and 415 in series.

By the operation of the line relay 416, a circuit is completed for the counting relay 101. The counting relay 101 operates to remove ground from conductor 13 at armature 130 and to complete a circuit for the counting relay 100 at the front contact of this armature. The latter operation is ineffective to bring about the operation of the relay 100 until the original energizing circuit of the relay 101 is opened.

By the disconnection of ground from conductor 13, the circuit of the relay 201 is opened and the relay is deenergized to open the circuit of the relay 205 at armature 213. It also opens the circuit of the relay 806 at armature 214 and removes ground from the conductor 232 at armature 215.

The deenergization of the relay 205 is without particular function at the present time as its armatures are held in their operative positions. By the disconnection of ground from conductor 232, the circuit of the relay 319 is opened and this relay is deenergized to complete a circuit for the relay 407. The relay 407 is energized to complete a circuit of the relay 408, relays 411 and 401 having been operated to prepare this circuit when the circuit of the counting relay 101 was completed.

The relay 408 is energized to open the driving circuit thereby bringing about the deenergization of the relay 416. As a result of the deenergization of the relay 416, relay 415 is operated and the impulsing circuit is opened with the result that the relay 100 is operated.

Upon energizing, the relay 100 removes the short circuit from the relay 127 at armature 129. Relay 127 is energized in series with all counting relays 100 to 125, inclusive, and operates to complete a circuit for the slow-releasing relay 126 at armature 153. The relay 126 is operated to open the circuits of the relays 100 to 125, inclusive, and of relay 127 at armature 150, to remove the ground from conductor 12 at armature 151 and to place ground upon conductor 11 at the front contact of this armature. The counting relays 100 to 125, inclusive, are deenergized to restore their respective circuits to normal. The relay 126, upon operating, at armature 150, also removes ground from conductor 34 whereby the circuits of the relays 317 and 318 are opened. The relay 317 is deenergized to open a point in the circuit of the relay 318 at armature 354, to open a point in the circuit of the relay 319 at armature 355. The relay 318 is deenergized to disconnect the signalling and control conductors 364 and 363 from the springs of the selecting relays at armatures 358 and 359, respectively, and to prepare a point in the circuit of the holding relay 406 at armature 359 and its back contact.

The relay 127 is deenergized after a short interval of time to open a point in the circuit of the slow-releasing relay 126. By the removal of ground from conductor 12, the relays 408, 414, 415 and 420 are deenergized with obvious results.

By the connection of ground to conductor 11, a circuit is completed for the relay 403. The relay 403 is energized to complete a locking circuit for itself at armature 425, to open the circuit of the relays 404 and 405 at armature 426, and to open the original energizing circuit of the relay 409 at armature 427. The relay 404 is deenergized to prepare a circuit for itself at armature 428 and to open a point in the circuit for the relay 405 at armature 429. The relay 405 is deenergized to prepare a circuit at armature 430 for relay 404 and to prepare a circuit at armature 431 for relay 406.

The slow-releasing relay 126 is deenergized after a short interval of time to prepare a circuit for the counting relays at armature 150, to remove ground from conductor 11 at armature 151 and to place ground on conductor 12 at the back contact of this armature.

The line relay 615 is operated to bring about the energization of the counting relay 724 at the second station. The relay 724 is operated to prepare a circuit for relay 725 at armature 750 and to remove ground from conductor 832 at armature 749. The relay 725 is not energized until the original energizing circuit of the relay 724 is opened. The removal of ground from conductor 832 opens the circuit of the relay 800. The relay 800 is deenergized to remove ground from conductors 581 and 831 and to open a point in the circuit for the relay 806 at armature 810. The deenergization of the relay 806 is without particular function at the present time by reason of the fact that the armatures 823, 824 and 825 are latched in operative positions. By the removal of ground from conductor 831, the relay 518 is deenergized to remove ground from conductor 561.

When the driving circuit is opened by the operation of the relay 408 at the first station, relay 615 is deenergized to bring about the removal of the short circuit from the counting relay 725. The relay 725 is operated to open another point in the original energizing circuit of the relay 724 at armature 751 and to remove the short-circuit from the relay 726 at armature 752. The relay 726 is energized in series with the counting relays 700 to 725, inclusive. Upon operating, relay 726 completes a circuit at armature 754 for the relay 727. The slow-releasing relay 727 is energized to open circuits of the relays 700 to 726, inclusive, at armature 755, to remove ground from conductor 678 at armature 756 and to place ground upon conductor 674 at the front contact of this armature.

Another result of the operation of the armature 755 of the relay 727 is that ground is removed from conductor 577 whereby the circuit of the relays 520 and 521 are opened. The relay 521 is deenergized to open a point in the circuit of the relay 520. The relay 520 is deenergized to disconnect the signalling and control conductors 364 and 363 from the springs of the selecting relays at armatures 545 and 546, respectively, and to prepare a holding circuit at armature 546 and its back contact.

The counting relays 700 to 725, inclusive, are immediately deenergized to restore their respective circuits to normal. By the removal of ground from conductor 678, the relays 602, 611, 616 and 618 are deenergized with obvious results.

By the connection of ground to conductor 674, a circuit is completed for the relay 604. The relay 604 is energized to open the circuit of relay 601 at armature 633, to establish a locking circuit for itself at armature 632 and to open one point in the circuit of the relay 607 at armature 631. The relay 601 is deenergized to open one point in the starting circuit at armature 623 and to open a point in the driving circuit at armature 624.

A holding circuit is now established that extends from ground by way of back contact and armature 431, holding relay 406, conductor 361, back contact and armature 359, conductor 363, armature 542 and back contact, armature 546 and back contact, conductor 562, armature 639 and its back contact and relay 603 to battery. The holding relays 406 and 603 are energized in series over this circuit.

The relay 406 is operated to open locking circuit for the relay 403 at armature 432, to prepare a starting circuit at armature 433 and to prepare a point in the energizing circuit of the relay 402 at armature 434. The relay 403 is deenergized to prepare a circuit for the relay 405 at armature 426 and to prepare another point in the circuit of the relay 402 at armature 427.

At the second station, the holding relay 603 is operated to prepare a starting circuit at armature 628, to open a point in the circuit of the relay 604 at armature 629, to prepare a point in the circuit of the relay 607 at the front contact of this armature and to prepare a circuit for the relay 610 at armature 630. The relay 604 is deenergized to prepare a point in the circuit for the relay 607 at armature 631 and to prepare a circuit for the relay 610 at armature 633.

In the above-described manner, the selecting equipment at the first and the second stations is released after all the counting relays have been operated, that is, after one selecting cycle has been completed.

At the first station, it will be recalled that the operation of the relay 209 placed ground upon conductor 231. Consequently, when the slow-releasing relay 404 is deenergized, it completes a circuit for itself at armature 428. The relay 404 is energized to complete a circuit for the relay 405 at armature 429 and to open its own circuit at armature 428. The armatures 428 and 429 are so adjusted that the armature 429 engages its front contact before the armature 428 disengages its back contact. The relay 405 is immediately operated to open the holding circuit.

At the second station, it will be recalled that the slow-releasing relay 600 also operated to bring about the energization of the relay 608. The relay 608 is operated to prepare a circuit for the relay 609 at armature 643 and to prepare a circuit for the relay 607 at armature 642.

When the relay 601 is deenergized at the end of the selecting cycle, the circuit of the relay 608 is opened and consequently the relay 609 is operated. The relay 609 is energized to open another point in the circuit of the relay 608 at armature 646 and to complete a circuit at armature 645 that extends from ground by way of said armature and front contact, armature 628 and front contact, armature 623 and its back contact, armature 638 and its back contact and relay 605 to battery.

The relay 605 is energized to complete a circuit for the relay 606 at armature 635 and to open the locking circuit for the relay 600 at armature 636. Another result of the operation of the relay 605 is that at armature 634 a circuit is completed that extends from ground by way of armature 629 and its front contact, armature 631 and its back contact, front contact and armature 634, armature 642 and its front contact, and relay 607 to battery. The relay 607 is operated to open the circuit of the relays 608 and 609.

The relay 608 is deenergized to prepare a locking circuit for the relay 600 at armature 644, to open the circuit of the relay 607 at armature 642 and to open another point in circuit of the relay 609 at armature 643. The relay 609 is deenergized to prepare a point in the circuit of the relay 608 at armature 646 and to open the previously traced circuit for the relay 605. The relay 606 is immediately energized in series with the relay 605 and operates to open another point in the original energizing circuit of the relay 605 at armature 638, to open another point in the holding circuit at armature 639 and to prepare a locking circuit for the relay 600 at armature 640.

By the openings of the holding circuit, the action of the driving circuit is again initiated to energize all the relays in the counting relay groups in the same manner as before.

When the counting relay 124, at the first station is energized, the switching relay 316 is energized over a circuit from ground through the front contact and armature 148, back contact and armature 144, conductor 10, contact 222, conductor 15 and through the winding of relay 316 to battery and ground. This relay, upon energization, associates the second group of selecting relays with the counting relays 100 to 125, inclusive.

By reason of the fact that the relay 205 is now operated instead of the relay 203, the operation of the counting relays at the first station consequently controls the relays of the second selecting group in a manner that is substantially the same as has been described in connection with the operation of the selecting relays of the first group.

In like manner, when the counting relay 701 at the second station is operated, the switching relay 522 is operated to associate the relays of the second selecting group with the counting relays 700 to 725, inclusive, by reason of the fact that the relay 806 is operated and the relay 808 has its armature in a normal condition. Consequently, the operation of the relays in the counting relay group in the second station, controls the operation of the selecting relays of the second group. The operation of the selecting and counting relays and the manner in which the signalling and control operations are performed will be obvious without further description.

After the selecting action has proceeded sufficiently to bring about the operation of the relay 114 at the first station, the relay 200 is energized over a circuit from ground over armature 150 and its back contact, armature 130 and its back contact, armature 142 and its front contact, conductors 13, front contact and armature 225 and the winding of relay 200 to battery and ground.

At the second station, relay 711 will be operated to bring about the operation of the relay 801. Relay 801 is energized over a circuit from ground through battery, winding of relay 801, armature 820 and its front contact, conductor 832, front contact and armature 737, back contact and armature 749 and back contact and armature 755 to ground. By the operation of the relay 200 at the first station, a circuit is prepared for the relay 203 at armature 210, ground is placed upon conductor 18 at armature 211 and at armature 212, a circuit is prepared for the relay 319.

At the second station, the operation of the relay 801 prepares a circuit for the relay 807 at armature 815. Circuits are now completed for energizing the relays 203 and 808. The relay 203 is energized to complete a circuit for the relay 319 at armature 217, to complete a circuit for the relay 204 at armature 218, and to prepare a circuit for the switching relay 315 at armature 219. The relay 204 is operated to permit the armature 221, 222 and 223 to restore to normal. The operation of the armature 223 opens the circuit of the relay 202. The relay 202 is deenergized to retract the armature 216. The relay 319 is operated to permit the driving circuit to function at the first station.

The relay 808 at the second station is operated to complete a circuit for the relay 807 and to prepare a circuit for the switching relay 523. The relay 807 is energized to permit the armatures 823, 824 and 825 to restore to normal. The operation of the armature 824 opens the circuit of the relay 809. The relay 809 is deenergized to retract the armature 830.

It will be noted in the present instance that provision is made only for two cycles of selecting relays to complete the selecting operations. However, as many groups may be provided as is necessary to take care of the desired number of apparatus units by providing other groups of selecting relays and causing the operation of the relays such as 200 to prepare a circuit for latching relays such as 205. The operation of the latching relays, such as 205 will then prepare circuits for the additional switching relays. The same provision may of course be made at the second station to take off whatever additions are necessary.

When the selecting apparatus at the first and second stations is released by the functioning of the apparatus in the manner previously described, the same holding circuit as has been traced will be established. However, the selecting equipment will not be reoperated by reason of the fact that there is no ground present on the conductor 231 inasmuch as armature of the relays 209 are in their normal position. Of course, if other groups of selecting relays were provided, the relay 207 would be operative to place ground upon conductor 231 and the operation would be started over again in the same manner as before described until all the selection had been made.

When an apparatus unit is operated at the station either by the action of automatic devices or by reason of being manually operated by the operator at the second station, it is desirable that the dispatcher receive an indication of such operation. In the description of the operation in this case, it will be assumed that the circuit interrupter C is closed and that it is tripped by the operation of an automatic device (not shown). By the operation of the auxiliary switch 532, a circuit is completed for the relay 502. The relay 502 is energized to complete a circuit for the slow-releasing relay 501 and to complete a circuit at armature 529 that extends from ground by said armature and its back contact, armature 524, conductor 560 and relay 600 to battery. The relay 600 is energized to operate to establish a locking circuit for itself at armature 621 and to complete a starting circuit at armature 620. If the selecting equipment is not functioning, the relay 605 will be the one operated; while if the selective equipment is operated, the relay 608 will be the one operated.

This is evident from the fact that, with the apparatus at rest, that is, in a non-operating condition, the relay system 603 is energized in series over the signalling line, as has already been described in detail. Upon the energization of the relay 600, a circuit is completed over the armature 620, armature 628 and its front contact, armature 623 and its back contact, armature 638 and its back contact through the winding of relay 605 to battery. The energization of relay 605 prepares a series locking circuit for itself and winding of relay 606 over armature 635 and its front contact and armature 633, while, at the same time, it opens the locking circuit of the relay 600 at armature 636.

After an interval of time, the relay 600 deenergizes, and the relays 605 and 606 are energized in series. The energization of relay 606 opens the holding circuit at armature 639, and the operations continue from there on in the manner that has already been described in detail. If, however, the automatic operation takes place while the set is in operation, the relay 601 is energized, its circuit having been completed as soon as the holding relay 603 deenergizes from ground over armature 633 and its back contact, armature 630 and its back contact, through the winding of relay 601 and the front contact and armature 637 to battery.

The energization of the relay 600, as a result of the automatic operation, will place ground from armature 620 over armature 623 and its front contact instead of armature 623 and its back contact, as described before, to the winding of relay 608. The energization of relay 608 opens the locking circuit of the relay 600 which this time was completed over the back contact and armature 634. As a result, the original energizing circuit for the relay 608 is opened and the relays 608 and 609 are energized in series. A permanent ground is now placed on armature 623 from armature 645. At the end of the operations, the holding relay 603 is again energized and the relay 601 deenergized. A circuit is now completed from ground at armature 645 over armature 628 and its front contact, armature 623 and its back contact to the winding of relay 605, and the cycle of operations is again repeated.

The manner in which the selecting equipment is started, following the operation of relay 600, is thought to be obvious from the preceding description. The completion of the signalling operations to indicate the position of the circuit interrupter C will occur in substantially the same manner as before.

The arrangement by which mechanical latching relays, such as relays 203 and 205, are operated over a circuit that extends between the first and second stations makes it more possible for the selecting action to remain synchronous. That is, it was previously possible in systems where one group of counting relays were made common to several groups of selecting relays to operate relays in different selecting groups in synchronism and thus obtain improper selection. This difficulty is avoided by providing relays that are operated simultaneously at both the first and the second stations over a circuit that extends between the stations. The provision of latching devices for these relays also insures that the circuits that they control will be maintained operated even though the battery supply at either station is disconnected. This also prevents false selection.

My invention is not limited to the particular arrangement of the apparatus described but may be variously modified without departing from the spirit of the invention as set forth in the appended claims.

I claim as my invention:

1. In a control system, the combination with a first and a second station, a group of counting relays at each station, a plurality of groups of selecting relays at each station, apparatus units at the second station, and signalling devices at the first station, of means for operating the relays in the counting relay groups in a definite sequence, means controlled by the relays in the counting relay groups for sequentially operating the relays in one of the selecting relay groups at each station to select apparatus units in the second station and signalling devices in the first station, a signalling circuit connecting the first and the second stations, means controlled by the apparatus units for operating the signalling devices over said circuit, and means controlled over said circuit for causing the relays in the counting relay group at the first station to sequentially operate the relays in another selecting relay group.

2. In a control system, the combination with a first and a second station, a group of counting relays at each station, a plurality of groups of selecting relays at each station, apparatus units at the second station, and controlling devices at the first station, of means for operating the relays in the counting relay groups in a definite sequence, means controlled by the relays in the counting relay groups for sequentially operating the relays in one of the selecting relay groups at each station to select apparatus units in the second station, controlling devices in the first station, a control circuit connecting the first and the second stations, means controlled by the apparatus units for operating the controlling devices over said circuit, means controlled over said circuit for causing the relays in the counting relay group at the second station to sequentially operate the relays in another selecting relay group, and means controlled by the controlling devices for causing the operation of said units over said circuit.

3. In a control system, the combination with a first and a second station, a group of counting relays at each station, a plurality of groups of selecting relays at each station, and a switching relay at each station and associated with each group of selecting relays, of means for operating the relays in the counting relay groups in a definite sequence, means for operating a switching relay at each station to associate the corresponding group of selecting relays with the counting relays at each station, means controlled by the counting relays for sequentially operating the selecting relays in the associated groups, means for again operating the relays in the counting relay groups at each station, and means individual to each switching relay for causing the operation of another switching relay at the second station after each cycle of counting relay operations, and means whereby said individual means are successively operated by an individual character of impulses over said line.

4. In a control system, the combination with a first and a second station, a group of counting relays at each station, a plurality of groups of selecting relays at each station, and a switching relay at each station associated with each group of selecting relays, of means for operating the relays in the counting relay groups in a definite sequence, means for transmitting an impulse between the stations individual to one of said switching relays at the end of a cycle of operations of counting relays in each group, means for operating an individual switching relay at each station in response to said impulse to associate the corresponding group of selecting relays with the counting relays at each station, means controlled by the counting relays for sequentially operating the selecting relays in the associated groups, means for again operating the relays in the counting relay groups at each station, means including a latching device controlled from the first station for causing the operation of another switching relay at the second station, and means whereby said latching device remains operated during a cycle of operations of the counting relays in connection with a group of selecting relays to maintain the switching relays operative during such cycle.

5. In a control system, the combination with a first station and a second station, a plurality of switching means at each station, means whereby said switching means are operated successively by impulses individual to said switching means, a group of counting relays at each station, and a plurality of groups of selecting relays at each station there being a relay in each group individual to a counting relay, of means for operating the relays in the counting relay groups a plurality of times corresponding to the number of groups of selecting relays, means controlled by each counting relay for operating one of its individual selecting relays, said impulses for operating the switching means being transmitted between the stations at the end of each cycle of operation of the counting relays, and means controlled jointly by said switching means in both stations for associating different groups of selecting relays with the counting relays upon each cycle of operation of the relays in the counting relay groups.

6. In a control system, the combination with a first station and a second station, a group of counting relays at each station, and a plurality of groups of selecting relays at each station comprising relays individual to said counting relays, a plurality of switching means at each station, means operative at the end of each cycle of operation of the counting relays for transmitting successive impulses of different character between the stations, each character of impulse being individual to one of said switching means, means for operating said switching means successively in response to the individual impulses, means for operating the relays in the counting relay groups a plurality of times corresponding to the number of groups of selecting relays, means responsive to each operation of the counting relay for operating an associated selecting relay, means controlled jointly by said switching means in both stations for associating different groups of selecting relays with the counting relays upon each operation of the relays in the counting relay groups, and means operative to maintain the proper group of selecting relays associated with the counting relays during such operation of the counting relays.

7. In a control system, the combination with a first and second station, a signalling line connecting said stations, a plurality of apparatus units at said second station, a group of counting relays at each station and a plurality of groups of selecting relays at each station, each selecting relay being individual to one of said apparatus units, means for operating the relays in the counting relay groups in a definite sequence and through a plurality of cycles, means controlled by the relays in the counting relay groups for operating the relays in one of the selecting relay groups in sequence in the first cycle, means individual to each selecting relay group for causing the operation of the counting relays to operate the relays in successive selecting groups after each cycle of counting relay operations, and means whereby said individual means are successively operated by an impulse of a predetermined character transmitted over said line at the end of each cycle of operation of the counting relay groups.

8. In a control system, the combination with a first and second station, a signalling line connecting said stations, a plurality of apparatus units at said second station, a group of counting relays at each station and a plurality of groups of selecting relays at each station, each selecting relay being individual to one of said apparatus units, means for operating the relays in the counting relay groups in a definite sequence and through a plurality of cycles, means controlled by the relays in the counting relay groups in the first cycle for sequentially operating the relays in one of the selecting relay groups at each station, means individual to each selecting relay group for causing the operation of the relays in the counting relay group at each station to operate the relays in a succeeding selecting relay group after each cycle of counting relay operation, and means whereby said individual means are successively operated by an individual character of impulse transmitted over the line after each cycle of operation of the counting relay group.

9. In a control system, a combination with a first station and a second station, a group of counting relays at each station and a plurality of groups of selecting relays at each station, means for operating the relays in the counting relay groups in a definite sequence and through a plurality of cycles, means controlled by the counting relay groups in their first cycle for sequentially operating the relays in one of the selecting relay groups at each station, a circuit extending between the first and second station, means operative at the end of each cycle for transmitting impulses over said circuit, the successive impulses transmitted over said circuit being each of a different character than the preceding impulse, and means responsive only to impulses of said predetermined character for causing the operation of the relays in the counting relay group at each station to operate the relays of another selecting relay group.

In testimony whereof I have hereunto subscribed my name this 20th day of August, 1925.

THOMAS U. WHITE.